United States Patent
Omamyuda et al.

[11] Patent Number: 5,260,710
[45] Date of Patent: Nov. 9, 1993

[54] VEHICULAR OPTICAL-RADAR APPARATUS

[75] Inventors: Yukio Omamyuda, Sagamihara; Shigeru Kimura, Yokohama; Toru Tanabe, Machida; Kazuhisa Iwasaki, Yokohama; Takao Seto, Yokohama; Hideki Kitamura, Yokohama; Kazuhiko Sugimura, Yokohama; Yasushi Senoo, Yokohama, all of Japan

[73] Assignee: Stanley Electric Co., Ltd., Tokyo, Japan

[21] Appl. No.: 825,525

[22] Filed: Jan. 24, 1992

[30] Foreign Application Priority Data

Jan. 31, 1991 [JP] Japan .................. 3-9563
Apr. 5, 1991 [JP] Japan .................. 3-30452

[51] Int. Cl.$^5$ ............... G01S 13/93; G01S 17/02; G01S 17/88; G01C 3/08
[52] U.S. Cl. ............... 342/70; 342/54; 356/5
[58] Field of Search .......... 356/5, 28.5; 342/70, 342/71, 72, 54

[56] References Cited

U.S. PATENT DOCUMENTS

| | | | |
|---|---|---|---|
| 3,176,294 | 3/1965 | Merlo et al. | 342/71 |
| 3,749,197 | 7/1973 | Deutsch | 342/71 X |
| 3,924,232 | 12/1975 | Burdi et al. | 342/54 |
| 4,129,775 | 12/1978 | O'Meara | 244/176 X |
| 4,195,425 | 4/1980 | Leitz et al. | 356/28 |
| 4,257,703 | 3/1981 | Goodrich | 356/4 |
| 4,290,043 | 9/1981 | Kaplan | 340/29 |
| 4,326,800 | 4/1982 | Fitts | 356/152 |
| 4,477,184 | 10/1984 | Endo | 356/141 |
| 4,552,456 | 11/1985 | Endo | 356/5 |
| 4,632,543 | 12/1986 | Endo | 356/5 |
| 4,662,735 | 5/1987 | Xarasaki et al. | 354/406 |
| 4,757,450 | 7/1988 | Etoh | 364/426 |
| 4,948,246 | 8/1990 | Shigematsu | 356/5 |
| 5,003,314 | 3/1991 | Berkowitz et al. | 342/372 |
| 5,028,129 | 7/1991 | Smith | 356/4 |
| 5,035,486 | 7/1991 | Inokuchi | 359/625 |
| 5,042,858 | 8/1991 | Schubert et al. | 293/24 |
| 5,057,833 | 10/1991 | Carlson | 340/961 |
| 5,061,052 | 10/1991 | DeJesus | 359/742 |

FOREIGN PATENT DOCUMENTS

| | | |
|---|---|---|
| 0357855 | 3/1990 | European Pat. Off. |
| 3106539 | 1/1982 | Fed. Rep. of Germany |
| 3616930 | 12/1986 | Fed. Rep. of Germany |
| 3637165 | 5/1988 | Fed. Rep. of Germany |
| 3827879 | 8/1989 | Fed. Rep. of Germany |
| 2105124 | 4/1972 | France |
| 2222991 | 3/1990 | United Kingdom |
| WO/8605149 | 12/1986 | World Int. Prop. O. |

OTHER PUBLICATIONS

Japanese Patent Abstract, vol. 7, No. 105, May 7, 1983, Automobile Measuring Device Using Doppler Radar.

*Primary Examiner*—John B. Sotomayor
*Attorney, Agent, or Firm*—Frishauf, Holtz, Goodman & Woodward

[57] ABSTRACT

A vehicular optical radar apparatus comprising a light emitting portion for irradiating a signal light on an object ahead and a light receiving portion for receiving a reflected light from the object. At least one of a light emitting lens and a light receiving lens are deformation-worked so that a distance between optical centers of the light emitting and receiving portions can be moved closer together, and an angle formed between an incident axis of incoming light and so that an outgoing light becomes small.

6 Claims, 6 Drawing Sheets

VEHICULAR OPTICAL-RADAR APPARATUS

BACKGROUND OF THE INVENTION

1. Field of the Invention

This invention relates to a vehicular optical-radar apparatus, and particularly to a vehicular optical-radar apparatus utilized for other optical radar apparatuses.

2. Description of the Prior Art

In the present society, a demand for traffic safety has been increased. Particularly, a multi-vehicle collision or the like on an expressway tends to directly lead to a large traffic accident, and measures to prevent such an accident should be taken.

As a method for preventing accidents, a system has been proposed in which the distance to a vehicle ahead and the difference of speed therefrom are detected and calculated to transmit a danger signal to a driver.

In a conventional optical distance-measuring apparatus, as shown in FIGS. 12 and 13, light emitted from a light emitting portion 1 arranged within a lens-barrel 5 transmitted through a light emitting lens 3 and is then formed into an outgoing light Lt. The outgoing light Lt irradiates on a reflecting body, for example, a reflex reflector of an object of a distant vehicle ahead or the like and is formed into a reflected light Lr, which is condensed by a light receiving lens 4 and received by a light receiving portion 2 of the lens-barrel 5.

A beam spot 7 reflected in a screen 6 irradiated on the object is substantially circular as shown in FIG. 14. In this case, the distance between the light emitting portion 1 and the light receiving portion 2 is D (see FIG. 13).

However, in the aforementioned prior art system, as the light emitting and light receiving lenses, circular lenses are used as they are in their shape without working. Therefore, the distance between optical centers of the light emitting portion 1 and the light receiving portion 2 is large. Accordingly, there arises a problem in that a quantity of reflected light (a quantity of receiving light) is reduced.

Further, the beam spot 7 irradiated on the object is circular as shown in FIG. 14, and unnecessary portions are present in upper and lower ends or the like. Accordingly, as shown in FIGS. 15 and 16, out of light irradiated on a reflecting body C, a portion in which an angle θ1 between an incident axis B and a reflected light F is large; that is, a less effective power portion is utilized. This causes a problem in that detection performance of the light receiving portion is deteriorated.

Moreover, the aforementioned optical distance-measuring apparatus for use with vehicles is insufficient in reliability such as precision. Further improvements have been required.

It is an object of the present invention to provide a vehicular optical-radar apparatus which can enhance the detetection performance of a light receiving portion and wherein unit assembly and mounting of the beam emitting and receiving portions to the vehicle are improved, while overcoming the problems noted above with respect to the prior art.

SUMMARY OF THE INVENTION

For achieving the aforementioned object, according to the present invention, there is provided a vehicular optical radar apparatus comprising a light emitting portion for irradiating a signal light on an object ahead and a light receiving portion for receiving a reflected light from said object, wherein a light emitting lens and a light receiving lens are deformation-worked so that a distance between optical centers of said light emitting and receiving portions can be moved closer, and an angle formed between an incident axis of incoming light and an outgoing light becomes small.

For achieving the aforementioned object, according to a further feature of the present invention, there is further provided a vehicular optical radar apparatus wherein a light receiving portion, a light emitting portion or or both light receiving and emitting portions of an optical distance-measuring apparatus are incorporated into a box to form a unit, and a horizontal reference surface to be horizontal with respect to a road surface when mounted on the vehicle is provided on an upper part of said box, and a level is mounted on said horizontal reference surface.

Light emitted from a light emitting portion (a light emitting element) passes through a light emitting lens and is formed into an outgoing light. At that time, a beam spot irradiated on a distant object, for example, a vehicle ahead, is formed into a substantially laterally lengthy elliptical shape as shown in FIG. 4.

The irradiated light is reflected by a reflex reflector at the rear of an object and formed into a reflected light, which is condensed by a light receiving lens and received by a light receiving portion (a light receiving element).

According to a further aspect of the present invention, a box is fixed so that it is horizontal while observing a level, and a unit is assembled so that a beam irradiating angle and a beam receiving angle are horizontal.

Prior to mounting the apparatus on the vehicle, an optical axis of a distance measuring system is adjusted using a level.

When the apparatus is mounted on the vehicle after the unit has been assembled, the vehicle is arranged horizontally and mounted so that the unit is horizontal while observing the level.

When the assembly of the unit and the mounting to the vehicle are completed in accordance with the aforementioned procedure, the level may be removed for re-use for other units or the level may remain mounted for use at the time of checking such as inspection.

After being mounted on the vehicle, adjustment can be made merely by a level without an optical aiming of a distance measuring system.

DESCRIPTION OF THE PREFERRED EMBODIMENTS

Figure 1:
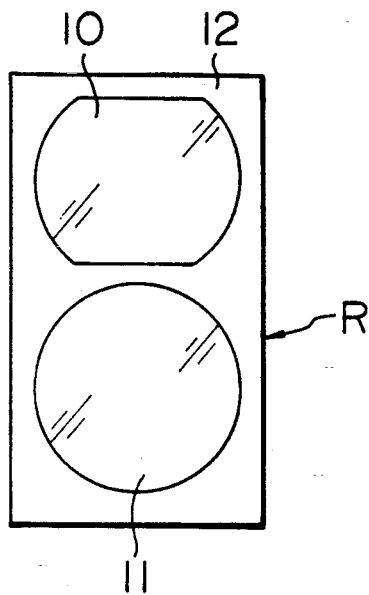
FIG. 1 is a front view of apparatus according to the present invention.

Embodiments of the apparatus according to the present invention will be described with reference to FIGS. 1 to 8. As shown in FIG. 2, a vehicular optical radar apparatus R according to the present invention comprises a light emitting portion 8 for irradiating a signal light on an object ahead and a light receiving portion 9 for receiving reflected light from said object.

An optical system mount 12 has the light emitting portion (light emitting element) 8 and the light receiving portion (light receiving element) 9 which are arranged in separate chambers. A light emitting lens 10 is arranged on the side of the light emitting portion 8, and a light receiving lens 11 is arranged on the side of the light receiving portion 9.

Figure 2:
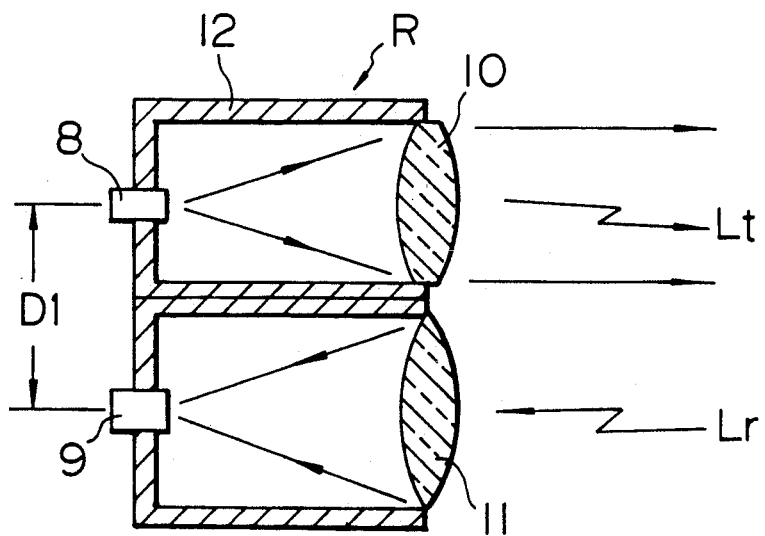
FIG. 2 is a partial sectional view of apparatus according to the present invention.
Figure 3:
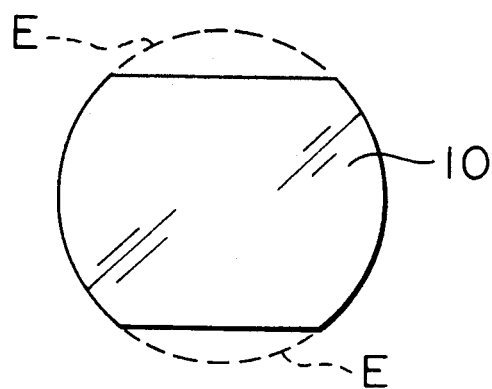
FIG. 3 is a view showing a working state of a lens.

FIGS. 1 and 2 show a first embodiment of the present invention. The light emitting lens 10 is deformation-worked with upper and lower peripheral end portions E cut off as shown in FIG. 3 so that the distance D1 between optical centers of both the light emitting and receiving portions 8 and 9 can be made smaller and an angle formed between an incident axis B of incoming light A to a reflecting object C and a reflected light F is formed into a small angle θ2 (see FIG. 8).

It is to be noted that the deformation-working of the light emitting lens 10 is not limited to the aforementioned upper and lower ends (peripheral portions).

The distance D1 between the optical centers can be moved closer to enhance the detection performance of the light receiving portion 9 without forming unnecessary beams in the light emitting portion 8 and the light receiving portion 9 by the deformation-working of the light emitting lens 10.

Figure 4:
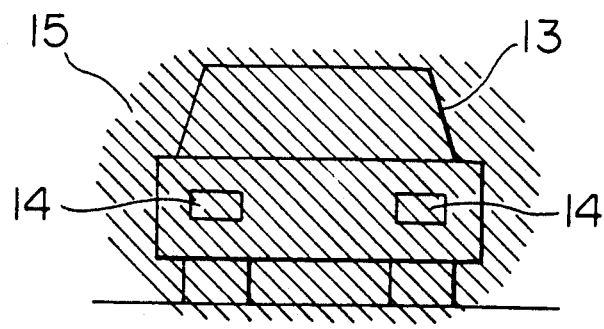
FIG. 4 is a view representative of an irradiated beam spot.

Light emitted from the light emitting portion (light emitting element) 8 passes through the light emitting lens 10 and is formed into an outgoing light Lt, and a beam spot 15 irradiated on a distant object 13, for example, a vehicle ahead is formed into a substantially laterally lengthy elliptical shape as shown in FIG. 4.

The irradiated light Lt is reflected by a reflex reflector 14 at the rear of the object 13 and is formed into a reflected light Lr, which is condensed by the light receiving lens 11 and received by the light receiving portion (light receiving element) 9.

Figure 5:
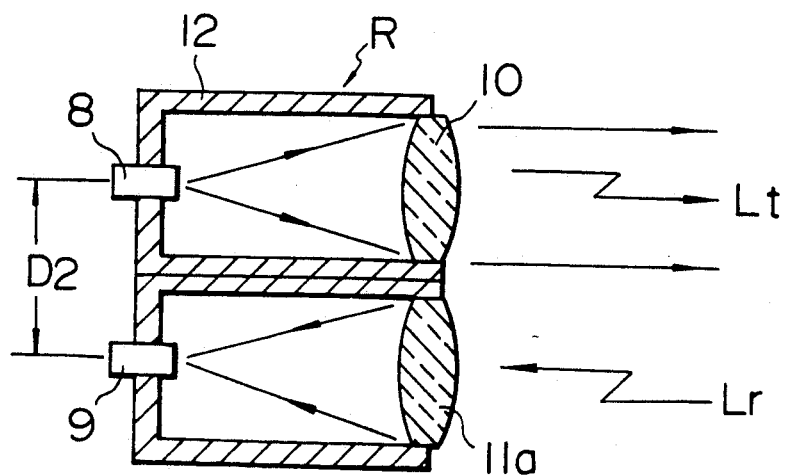
FIG. 5 is a partial sectional view showing a second embodiment of apparatus according to the present invention.
Figure 6:
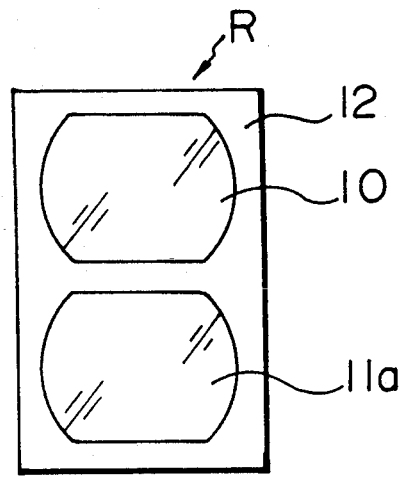
FIG. 6 is a front view of the second embodiment of apparatus according to the present invention.

FIGS. 5 and 6 show a second embodiment according to the present invention. Both a light emitting lens 10 and a light receiving lens 11a are similarly deformation-worked at portions of their respective peripheries.

Figure 7:
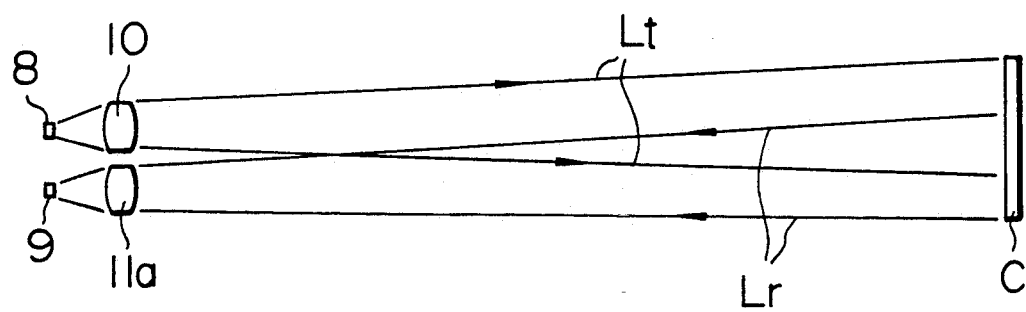
FIG. 7 is an optical explanatory view of the present invention.

FIG. 7 is an optical explanatory view in the case where the aforementioned lenses 10 and 11a are used.

In the case of the second embodiment, since both the light emitting and receiving lenses 10 and 11a are deformation worked at their peripheries, the distance D2 between the light emitting portion and the light receiving portion is in the relation of D1>D2, wherein D1 is the distance between the light emitting portion and the light receiving portion in the case of the first embodiment in which only the light emitting lens 10 is deformation worked. Accordingly, the distance between the optical centers of the light emitting and receiving portions 8 and 9 is moved closer.

Figure 9:
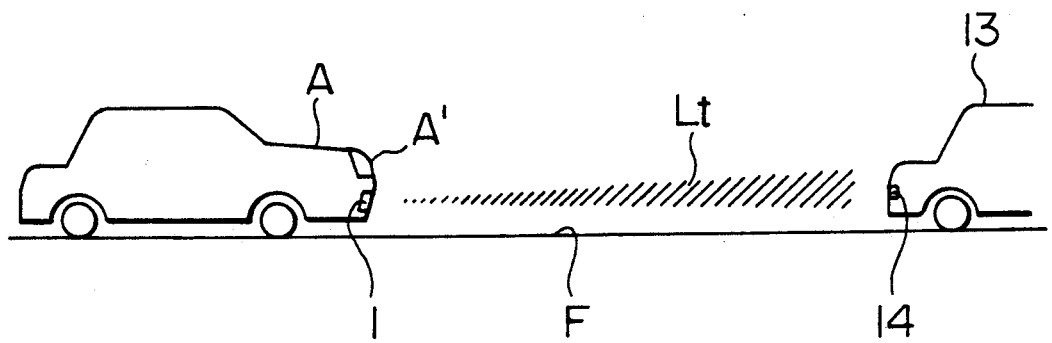
FIG. 9 is a view for explaining operation when a unit is mounted on a vehicle.
Figure 10:
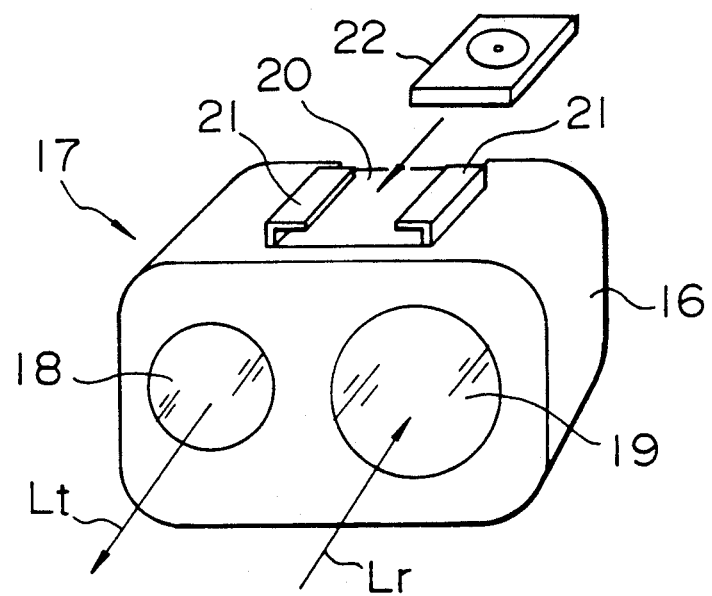
FIG. 10 is a perspective view of one embodiment according to the present invention.
Figure 11:
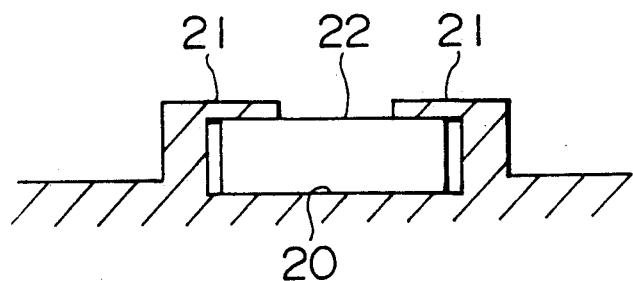
FIG. 11 is a sectional view showing an example in which a level is mounted.
Figure 12:
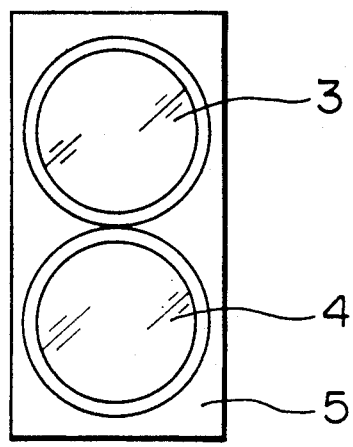
FIG. 12 is a front view of a conventional apparatus.
Figure 13:
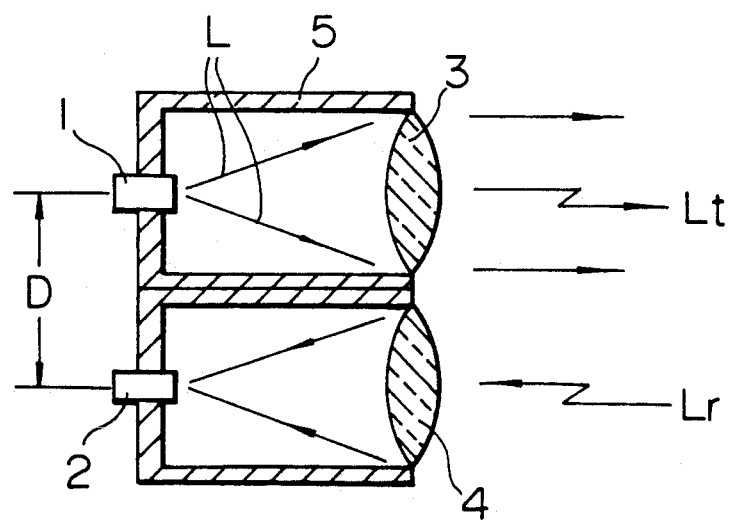
FIG. 13 is a partial sectional view of a conventional apparatus.
Figure 14:
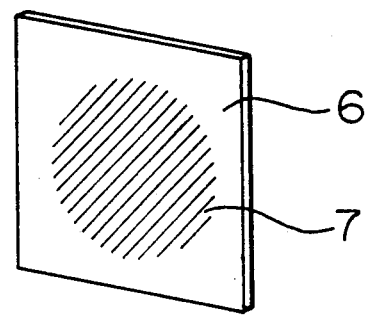
FIG. 14 is a view showing a beam spot in a prior art apparatus.
Figure 15:
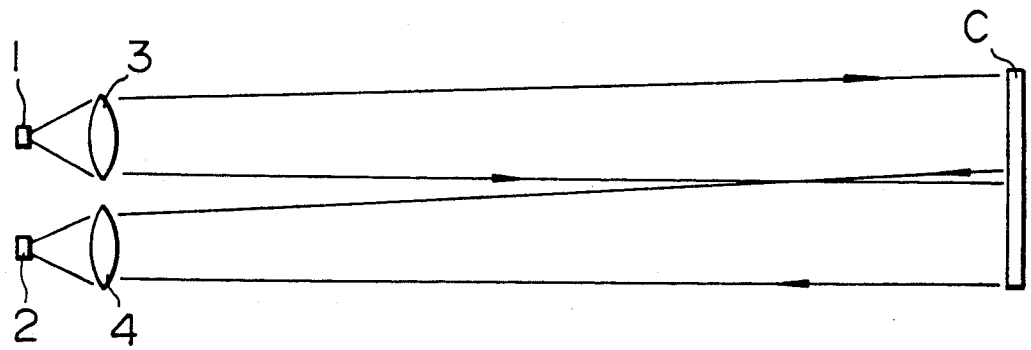
FIG. 15 is an optical explanatory view of a conventional apparatus.
Figure 16:
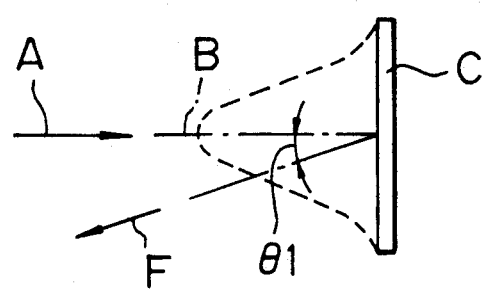
FIG. 16 shows a power distribution of reflecting light with respect to incoming light according to the prior art.

In FIGS. 9 to 11, at a front portion A' of a vehicle A, within a box or housing 16 is mounted a unit 17 in which a light receiving portion, a light emitting portion or light emitting and receiving portions (not shown) of an optical distance-measuring apparatus which forms a vehicular radar system are collectively incorporated.

The box (housing) 16 is provided with an irradiation window 18 and a light receiving window 19. An irradiation beam Lt is irradiated from the irradiation window 18, and a received light beam Lr is inputted from the light receiving window 19.

The distance and a speed difference with respect to a vehicle 13 ahead, are obtained by irradiating the light beam Lt on the rear portion 14 of the vehicle 13 ahead and taking a difference in time required till the light receiving portion receives the reflected beam. Accordingly, the unit 17 is assembled so that an angle of irradiation of the beam Lt is drawn to some extent and the beam is irradiated substantially horizontally to a road surface F in order that the beam Lt is positively irradiated on only the rear portion 14 of the vehicle ahead 13.

In order that the beam Lt is positively irradiated on the rear portion 14 of the vehicle ahead 13 as shown in FIG. 9 when the unit 17 has been mounted to the vehicle A, it is necessary that when the unit 17 is assembled, the beam irradiation angle is coincided with the light receiving angle and also with the installation angle of the unit box 16, and when the unit 17 is mounted on the vehicle A, the horizontal angle of the vehicle is coincided with the installation angle of the box 16.

A parallel reference surface 20 to be horizontal with the road surface F when mounted on the vehicle is provided on the upper portion of the box 16, and mounting plates 21 are provided on opposite ends of the horizontal reference surface 20. A level 22 is mounted by the mounting plates 21.

In the present embodiment, assembly of and mounting of the unit 17 to the vehicle A have been accomplished by the single level 22. However, in the case where the provision of the mounting plates 21 for the level 22 is difficult in terms of mechanism or in terms of design, only the reference surface 20 is provided, and the level 22 may be prepared by individual processes (i.e., a separate level can be used).

Even in this case, adjustment can be easily carried out by preparing the level 22 at the time of checking, such as during an inspection.

Since the apparatus according to the present invention is configured as described above, the following effects are obtained.

Figure 8:
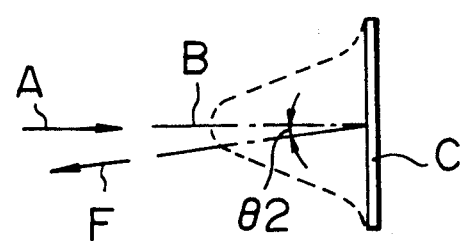
FIG. 8 shows a power distribution of reflected light with respect to incoming light according to the present invention.

Since the center position between the light emitting and receiving portions is closer, detection at a portion close to the incident axis becomes possible to improve the detection performance in the light receiving portion (see FIGS. 7 and 8).

Furthermore, since the shape of the light emitting lens is deformation-worked, the shape of the radiation beam can be made variable.

Moreover, since the shape of both the light emitting lens and light receiving lens is can be deformation-worked, the distance between the light emitting portion (light emitting element) and the light receiving portion (light receiving element) can be made smaller to increase the quantity of received light.

In addition, since the diameter of the light receiving lepis and light emitting lens can be formed to be smaller than that of the conventional lens, the optical portions can be miniaturized, and the apparatus can be also miniaturized. Mounting work can be simplified by the miniaturization of the optical portions.

Moreover, since the horizontal reference surface is provided on the upper portion of the box and the level can be installed on the horizontal reference surface, the beam irradiation angle with respect to the box and the beam receiving angle when the unit is assembled are easily adjusted by use of the level. In addition, also when the unit is mounted on the vehicle, adjustment of angle can be easily made.

Furthermore, at the time of inspection, adjustment of the unit mounting angle is easily carried out without optical aiming of the distance measuring system whereby a reduction in process cost can be expected.

What is claimed is:

1. A vehicular optical radar apparatus comprising:
 a light emitting portion and a light emitting lens, for irradiating a signal light on an object ahead;
 a light receiving portion and a light receiving lens, for receiving a reflected light from said object;
 said light emitting and light receiving lenses being arranged with peripheral portions thereof adjacent each other;
 said light emitting lens and said light receiving lens both being deformation-worked at peripheral edge portions thereof, and wherein both opposite side peripheral edge portions of both of said light emitting and light receiving lenses are cut off to provide opposite substantially flat side edge surfaces with arcuate edge surfaces between said substantially flat side edge surfaces of each of said light emitting and light receiving lenses, a substantially flat side edge surface of one of said lenses being arranged adjacent a substantially flat side edge surface of the other of said lenses to thereby reduce a distance between optical center of said adjacent light emitting and light receiving lenses when said lenses are arranged adjacent each other, and such that an angle formed between an incident axis of incoming light and an outgoing light becomes small.

2. The vehicular optical radar apparatus of claim 1, wherein said deformation worked light emitting lens produces an elliptically shaped radiation pattern toward said object ahead.

3. A vehicular optical radar apparatus comprising:
 a housing;
 a light receiving portion and a light emitting portion of an optical distance-measuring apparatus collectively incorporated into said housing to form a unit, said light receiving portion including a light receiving lens and said light emitting portion including a light emitting lens;
 said light emitting lens and light receiving lenses both being deformation-worked at peripheral edge portions thereof, and wherein both opposite side peripheral edge portions of both of said light emitting and light receiving lenses are cut off to provide opposite substantially flat side edge surfaces with arcuate edge surfaces between said substantially flat side edge surfaces of each of said light emitting and light receiving lenses, a substantially flat side edge surface of one of said lenses being arranged adjacent a substantially flat side edge surface of the other of said lenses to thereby reduce a distance between optical centers of said adjacent light emitting and light receiving lenses when said lenses are arranged adjacent each other, and such that an angle formed between an incident axis of incoming light and an outgoing light becomes small;
 said housing having a horizontal reference surface provided on an upper portion thereof, said horizontal reference surface being arranged to be parallel with a road surface when mounted on a vehicle; and
 a level device mounted on said horizontal reference surface for enabling leveling of said reference surface of said housing.

4. The vehicular optical radar apparatus of claim 3, wherein said level device comprises a visually observable level member.

5. The vehicular optical radar apparatus of claim 3, wherein said level device is removably mounted to said horizontal reference surface of said housing.

6. The vehicular optical radar apparatus of claim 5, wherein said horizontal reference surface comprises retaining means for retaining said level device, and wherein said level device is slidable into and out of engagement with said retaining means.

* * * * *

UNITED STATES PATENT AND TRADEMARK OFFICE
CERTIFICATE OF CORRECTION

PATENT NO. : 5,260,710

DATED : November 9, 1993

INVENTOR(S) : OMAMYUDA et al

It is certified that error appears in the above-identified patent and that said Letters Patent is hereby corrected as shown below:

```
Title page, Item [19], "Omamyuda" should be --Ohmamyuda--

Item [75] Inventors, "Omamyuda" should be --Ohmamyuda--

Item [57] ABSTRACT, line 8 after "and", insert --so that--
                   line 9, delete "so that".

Column 1, line 22, before "transmitted", insert --is--

Column 4, line 41, change "parallel" to --horizontal--;
Column 4, line 41, change "horizontal" to --parallel--.
```

Signed and Sealed this

Twenty-sixth Day of September, 1995

*Attest:*

BRUCE LEHMAN

*Attesting Officer*   *Commissioner of Patents and Trademarks*